United States Patent [19]
Yokomachi et al.

[11] Patent Number: 5,201,189
[45] Date of Patent: Apr. 13, 1993

[54] REFRIGERANT COMPRESSOR WITH AN INITIAL SEIZURE PREVENTION MEANS

[75] Inventors: Naoya Yokomachi; Kazuhiro Tanikawa; Toshiyuki Nakajima; Tetsuya Takashima, all of Kariya, Japan

[73] Assignee: Kabushiki Kaisha Toyoda Jidoshokki Seisakusho, Kariya, Japan

[21] Appl. No.: 755,692

[22] Filed: Sep. 6, 1991

[30] Foreign Application Priority Data

Sep. 13, 1990 [JP] Japan .................. 2-245684

[51] Int. Cl.⁵ ............................. F25B 41/00
[52] U.S. Cl. ................. 62/196.3; 62/228.3; 417/299
[58] Field of Search .......... 62/193, 196.3, 228.3, 62/217; 417/299

[56] References Cited

U.S. PATENT DOCUMENTS

| | | | |
|---|---|---|---|
| 2,208,428 | 7/1940 | Nicolet | 62/196.3 X |
| 2,363,273 | 11/1944 | Waterfill | 62/196.3 X |
| 2,734,346 | 2/1956 | Dickieson, Jr. | 62/217 X |
| 4,557,670 | 12/1985 | Inagaki et al. | 417/299 |

FOREIGN PATENT DOCUMENTS

1-138382 5/1989 Japan .

*Primary Examiner*—William E. Wayner
*Attorney, Agent, or Firm*—Brooks Haidt Haffner & Delahunty

[57] ABSTRACT

A refrigerant compressor to be incorporated in a refrigerating circuit of a car air-conditioning system, having a suction side connected to the refrigerating circuit for receiving a refrigerant gas to be compressed, a discharge side for delivering the refrigerant gas after compression, and a bypass passageway arranged between the suction and discharge sides and constantly closed by a passageway-closing valve, and opened by the passageway-closing valve, only when the lowering of a suction pressure prevailing on the suction side to a pressure level below the atmospheric pressure level immediately after a start of the operation of the compressor at a high speed after a long non-operation of the car air-conditioning system.

2 Claims, 7 Drawing Sheets

REFRIGERANT COMPRESSOR WITH AN INITIAL SEIZURE PREVENTION MEANS

BACKGROUND OF THE INVENTION

1. Field of the Invention

The present invention relates to a refrigerant compressor suitable for use with an air-conditioning system of vehicles, such as motor cars. More particularly, it relates to a refrigerant compressor internally or externally provided with means for preventing a seizure of internal mechanical moving elements of the compressor due to a lack of lubrication during an initial short period immediately after a start of the compressing operation thereof.

2. Description of the Related Art

Various types of refrigerant compressors such as a swash plate type refrigerant compressor, a variable capacity wobble plate type compressor, and a scroll type rotary compressor, have been used with vehicle air-conditioning systems. Namely, In the car air-conditioning system, the refrigerant compressor of the above-mentioned type is incorporated in a refrigerating circuit, and arranged to be driven by a car engine to thus compress a refrigerant gas to be delivered toward the circuit. The compressed refrigerant gas at a high temperature and pressure state is subsequently liquefied by a condenser, and the liquefied refrigerant is thereafter expanded by an expansion valve of the circuit to become a low temperature refrigerant mist under a low pressure. The refrigerant mist is then forwarded to an evaporator of the refrigerating circuit where at a heat exchange is carried out to cool the atmospheric air passing through the evaporator. Accordingly, the evaporated refrigerant after cooling the atmospheric air is returned to the compressor as a suction refrigerant gas, via a suction throttling valve by which the amount of the refrigerant gas to be sucked by the compressor is controlled.

The above-described refrigerant compressor is provided with various mechanical portions and elements therein which must be lubricated during the operation of the compressor. For example, various radial and thrust bearings, reciprocating pistons, cylinder bores, a rotary swash plate, shoes, an inclination changeable wobbling assembly, and so on, must be lubricated during the operation of the compressor, and therefore, a lubricating oil is usually stored in the compressor so that the lubricating oil in the state of an oil mist suspended in the refrigerant gas is supplied to the mechanical moving elements by an oil distribution mechanism provided in the compressor. Nevertheless, when the refrigerant compressor is started after a long non-operation of the car air-conditioning system, often the lubricating oil is not supplied to the mechanical moving elements, because the oil distribution mechanism does not immediately operate. Accordingly, a seizure of the mechanical moving elements often occurs in a short period immediately after the start of the operation of the compressor, which results in a failure of the operation of the compressor per se.

A further description of the prior art refrigerant compressor and car air-conditioning system will be provided below with reference to FIGS. 7 through 9.

Figure 7:
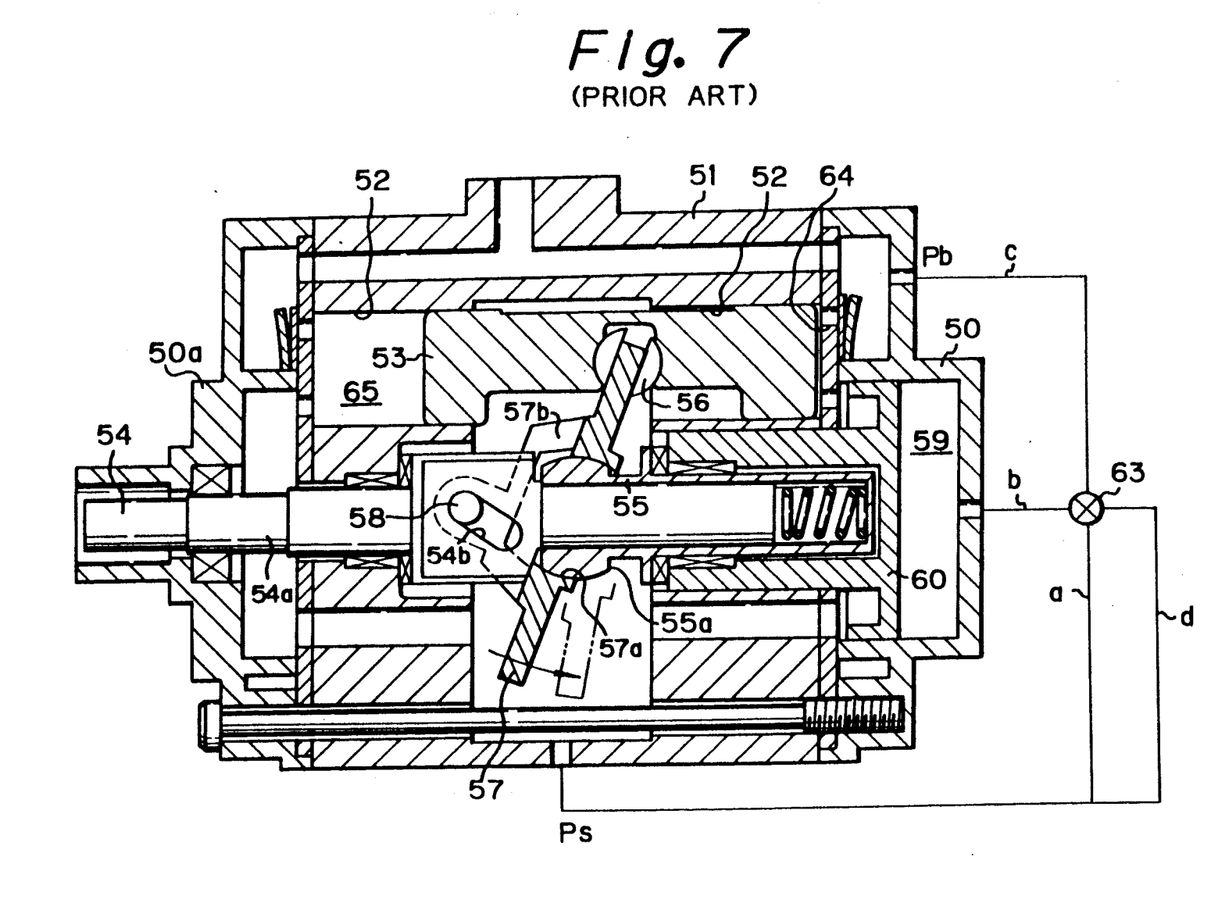
FIG. 7 is a longitudinal cross-sectional view illustrating an example of a refrigerant compressor according to the prior art.

FIG. 7 illustrates a typical variable capacity rotary swash plate type refrigerant compressor according to the prior art disclosed in Japanese Unexamined Patent publication ( Kokai ) No. 1-138382. The refrigerant compressor has an axially extended cylinder block 51 in which a plurality of axially extended cylindrical bores 52 are arranged around an axis of the cylinder block 51. In each of the cylinder bores 52 is slidably received a double headed piston 53 having a radial recess opening toward the axis. A drive shaft 54 is mounted in the cylinder block 51 so that it is extended along the above-mentioned axis of the cylinder block 51, and has a tubular slide 55 slidably fitted thereon. The slide 55 has a spherical seat 55a at an end thereof, on which a rotary swash plate 57 is movably supported via a corresponding spherically bored portion 57a. The peripheral portion of the swash plate 57 is engaged with the recesses in the plurality of double-headed pistons 53 via shoes 56 having a partial spherical surface portion, and therefore, the rotation of the swash plate 57 causes a reciprocating motion of each of the double-headed pistons 53. The rotary swash plate 57 is provided with a bifurcated connecting arm 57b extended toward a front side of the compressor and having a lateral guide pin 58 fixed thereto, to be movably engaged in an elongated guide bore 54b bored in a portion of a front part 54a of the drive shaft 54. Namely, when the slide 55 is slid on the drive shaft 54, the swash plate 57 is able to change an angle of inclination thereof with regard to a plane perpendicular to the axis of the drive shaft 54, because the guide pin 58 of the swash plate 57 is moved under the guidance of the guide bore 54b. The center about which the swash plate 57 performs the inclining motion is located so that the reciprocating motion of the double-headed pistons 53 occurs in a manner such that the top dead center of each piston 53 in the corresponding cylinder bore 52 on the rear side is always unchanged. During the reciprocating motion of the double-headed pistons 53 within the cylinder bores 52, to compress a refrigerant gas, a reacting force acts on each of the pistons 53 in response to a compression of the refrigerant gas, and this reacting force generates a moment "M" which always urges the swash plate 57 to reduce the angle of inclination thereof. As a result, a plunger 60 arranged on the rear side of the compressor is constantly axially urged toward the rear side, i.e., to the right in FIG. 7, via the slide 55.

The compressor is also provided with a front housing 50a and a rear housing 50b, each defining therein a suction chamber for receiving the refrigerant gas before compression, and a discharge chamber for receiving the refrigerant gas after compression. The rear housing 50b also defines a control chamber 59 in which the above-mentioned plunger 60 is axially movably fitted and has a circular pressure receipt surface facing the control chamber 59. The control chamber 59 is fluidly connected to a directional control valve 63 by which either a discharge pressure "Pd" from the rear discharge chamber or a suction pressure "Ps" from the front and rear suction chambers is introduced in to the control chamber 59. The discharge or suction pressure in the control chamber 59 urges the plunger 60 toward the front side, i.e., to the left in FIG. 7, and therefore, the plunger 60 has a tendency to occupy a position where at the above-mentioned axially opposite two urging forces are balanced. This position changes in response to a change in each of the two urging forces, and as a result, the angle of inclination of the swash plate 57 is set depending upon the position occupied by the plunger 60; the angle of inclination of the swash plate 57 determines the discharge capacity of the compressor.

When the above-described rotary swash plate type refrigerant compressor is used with a car air-conditioning system, the compressor is incorporated in a refrigerating circuit of the system and is driven by the car engine, when connected to the car engine via an electromagnetic clutch.

Figure 8:
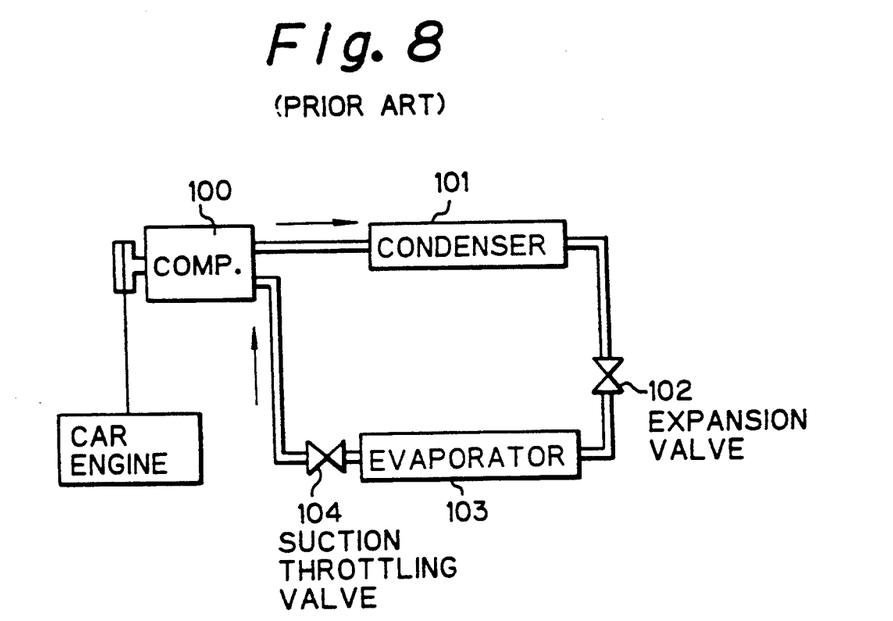
FIG. 8 is a schematic refrigerating circuit of a car air-conditioning system employing the compressor of FIG. 7.
Figure 9:
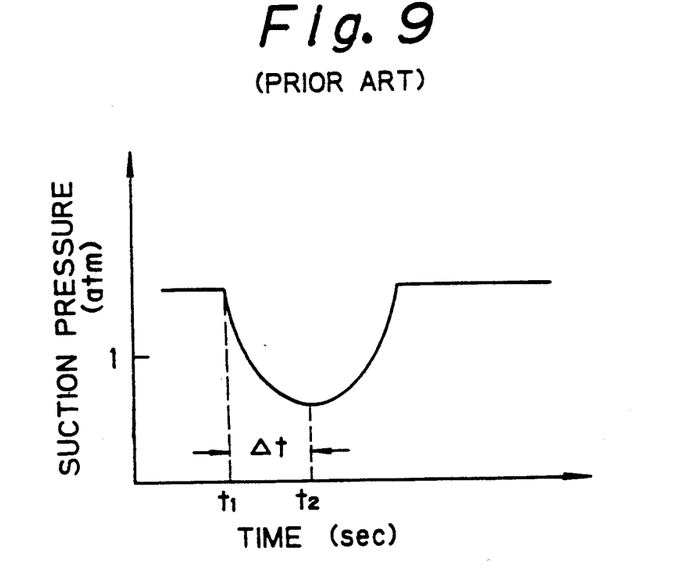
FIG. 9 is a graphical view, illustrating a relationship between the operation time and the suction pressure level of the compressor according to the prior art, when the prior art compressor is used with a car air-conditioning system.

FIG. 8 illustrates an example of the car air-conditioning system according to the prior art. The air-conditioning system includes indispensable elements such as a refrigerant compressor 100, e.g., the compressor of FIG. 7, a condenser 101, an expansion valve 102, an evaporator 103, a suction throttling valve mechanism 104, and refrigerant circulating conduits interconnecting these elements. A compressed refrigerant gas at a high temperature and a high pressure is delivered from the delivery side of the compressor 100 into the refrigerating circuit and liquefied by the condenser 101, and the liquefied refrigerant is then expanded by the expansion valve 102 to become a low temperature mist under a low pressure. The refrigerant mist cools the atmospheric air when the mist is passed through the evaporator 103, and thereafter, returns to the suction side of the compressor 100 via the suction throttling valve 104, which controls the amount of the refrigerant gas to be sucked by the compressor 100. In FIG. 8, solid arrow lines indicate the stream of the refrigerant gas with respect to the compressor 100.

In the car air-conditioning system, when the compressor 100 is started after a long non-operation of the system, a seizure of the internal portions and elements of the compressor 100 to be lubricated, e.g., particularly the contacting portions between the double-headed pistons 53 and the cylinder bores 52 slid by and between the spherically bored portion 57a of the swash plate 57 and the spherical seat 55a of the slide 55, and the contacting portions between the shoes 56 and the recessed portions of the double-headed pistons 53, occurs due to a lack of lubrication. Namely, when the car air-conditioning system is not operated for a long time, the refrigerant gas in the compressor 100 is gradually liquefied under the influence of temperature differences among respective portions in the system, and accordingly, a lubricant component in the state of an oil mist suspended in the refrigerant gas is completely separated from the liquefied refrigerant. In this state, when the compressor 100 is suddenly started at a high speed, the lubricant oil in the compression chambers 64 and 65 of the cylinder bores 52 is forcibly driven out of the compressor toward the external refrigerating circuit of the air-conditioning system, and therefore, the compression chambers cannot be lubricated until the driven lubricating oil is returned to these chambers after circulating through the refrigerant circuit. Further, the lubricating oil reserved in the bottom of the compressor cannot provide the compression chambers 64 and 65 and the other internal mechanical portions of the compressor with sufficient lubrication immediately after the start of the compressor. More specifically, in the compressor 100, which uses an oil mist suspended in the refrigerant gas for lubricating the internal mechanical portions and elements thereof, the following phenomenon shown in the graph of FIG. 9 (the abscissa indicates the time of the operation of the compressor 100, and the ordinate indicates a suction pressure of the compressor 100) unavoidably appears. Namely, in the graph of FIG. 9, when the compressor 100 is started at a high speed at a time $T_1$ after a long non-operation of the compressor 100, since the refrigerant gas cannot immediately flow to the suction side of the compressor from the evaporator 103 of the refrigerating system, a suction pressure Ps of the compressor 100 shows an immediate and extreme drop for a short time $\Delta t$, and therefore, a supply of the lubricating oil to the internal mechanical portions of the compressor to be lubricated is not carried out during the time $\Delta t$. Accordingly, a seizure of the mechanical portions easily occurs during the time $\Delta t$ when the compressor 100 is started after a long non-operation of the car air-conditioning system.

SUMMARY OF THE INVENTION

Therefore, an object of the present invention is to prevent a seizure of a refrigerant compressor incorporated in the refrigerating circuit of a car air-conditioning system immediately after a start of the operation of the compressor.

Another object of the present invention is to provide a refrigerant compressor with internal or external means for protecting the internal portions and elements of the compressor to be lubricated from an occurrence of a seizure during a short period after the operation of the compressor is started at a high speed after a long non-operation of a car air-conditioning system in which the compressor is incorporated.

In accordance with one aspect of the present invention, there is provided a refrigerant compressor having a suction side from which a refrigerant gas before compression is sucked into the compressor and a discharge side from which a refrigerant gas after compression is delivered, incorporated in a refrigerating circuit of a car air-conditioning system, which comprises:

a bypass passageway means internally provided in the compressor as a short-circuit between the discharge side and the suction side, to thereby permit the refrigerant gas after compression and having a lubricant oil suspended therein to flow directly from the discharge side toward the suction side; and a pressure sensitive closing valve disposed in the bypass passageway means for opening the bypass passageway means when a lowering of a suction pressure prevailing in the suction side to a level lower than the atmospheric pressure level is sensed at a time immediately after a start of the operation of the compressor, the pressure sensitive closing valve including a pressure sensitive element arranged to be moved in response to the lowering of the suction pressure from the atmospheric pressure level, and a valve element operatively connected to the pressure sensing element for constantly closing the bypass passageway means and opening the bypass passageway in response to the movement of the pressure sensing element.

When the pressure sensitive closing valve opens the internal bypass passageway of the compressor in response to the sensing of the lowering of the suction pressure to a pressure level below the atmospheric pressure immediately after the start of the operation of the compressor, the discharge side of the compressor is short-circuited to the suction side of the compressor, and accordingly, the refrigerant gas after compression and containing therein the lubricating oil mist is made to flow directly from the discharge side to the suction side, to thereby lubricate the internal mechanical portions and elements before a seizure of such internal mechanical portions and elements can occur.

In accordance with another aspect of the present invention, there is provided a refrigerant compressor having a suction side from which a refrigerant gas before compression is sucked into the compressor and a discharge side from which a refrigerant gas after compression is delivered, incorporated in a refrigerating circuit of a car air-conditioning system, which comprises:

an external bypass passageway means arranged externally of the compressor for providing a fluid connection between the discharge side and the suction side to thereby permit a flow of the refrigerant gas after compression from the discharge side toward the suction side; and a pressure sensitive closing valve disposed in the external bypass passageway means for opening the bypass passageway means when a lowering of a suction pressure prevailing in the suction side of the compressor to a level lower than the atmospheric pressure level is sensed at a time immediately after a start of the operation of the compressor, the pressure sensitive closing valve including a pressure sensitive element arranged to be moved in response to a lowering of the suction pressure with respect to the atmospheric pressure, and a valve element operatively connected to the pressure sensing element to constantly close the bypass passageway means and open the bypass passageway in response to the movement of the pressure sensing element.

When the pressure sensitive closing valve opens the external bypass passageway arranged externally of the compressor in response to sensing of the lowering of the suction pressure to a level lower than the atmospheric pressure immediately after the start of the operation of the compressor, the discharge side of the compressor is short-circuited to the suction side of the compressor via the external bypass passageway, and accordingly, the refrigerant gas after compression containing therein a lubricating oil is made to flow direct from the discharge side to the suction side of the compressor, whereby the internal mechanical portions and elements of the compressor are lubricated by the lubricating oil contained in the refrigerant gas before a seizure of the internal mechanical portions and elements can occur.

BRIEF DESCRIPTION OF THE DRAWINGS

The above and other objects, features, and advantages of the present invention will be made apparent from the ensuing description of the embodiments with reference to the accompanying drawings wherein.

DESCRIPTION OF THE PREFERRED EMBODIMENTS

Figure 1:
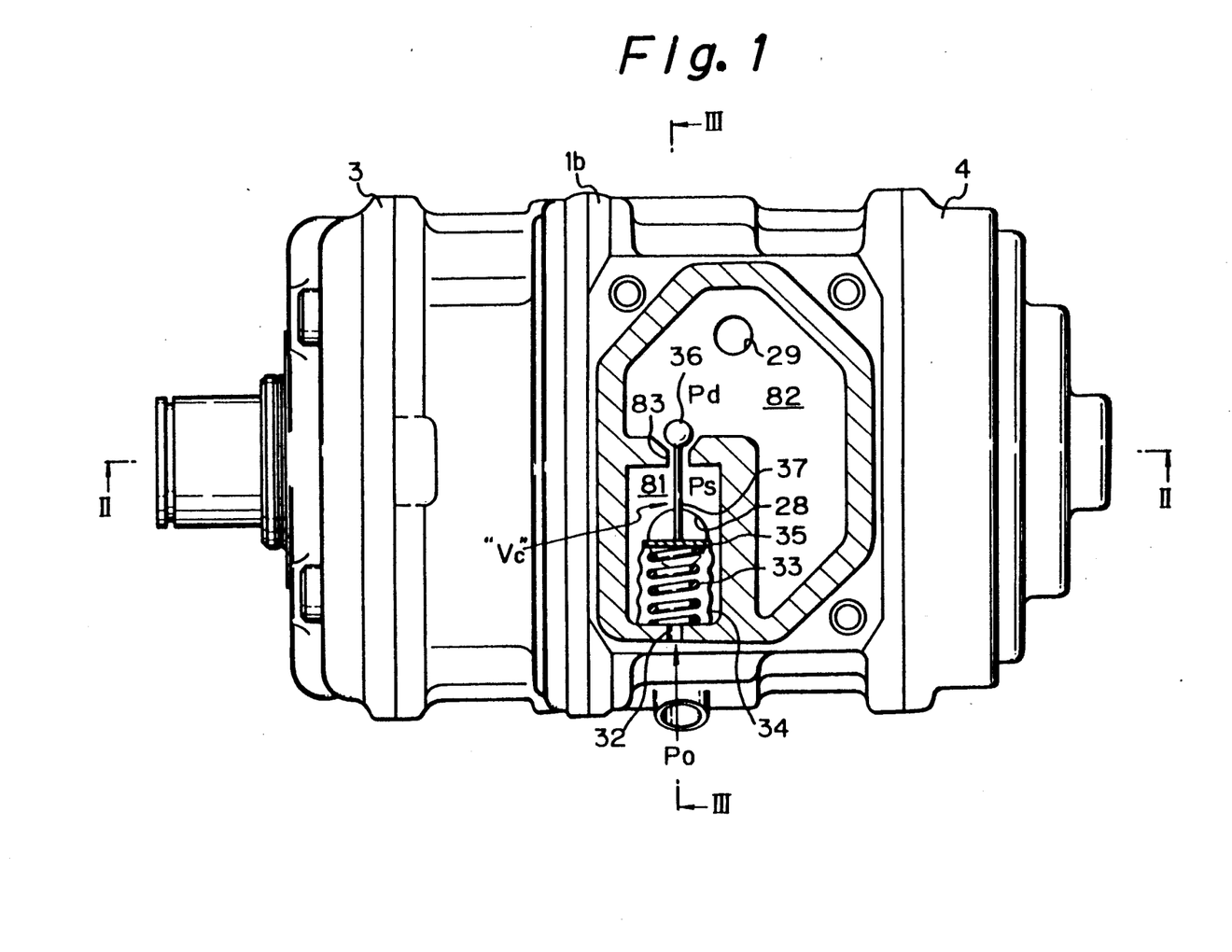
FIG. 1 is a plan view, in part cross section, of a compressor according to an embodiment of the present invention.
Figure 2:
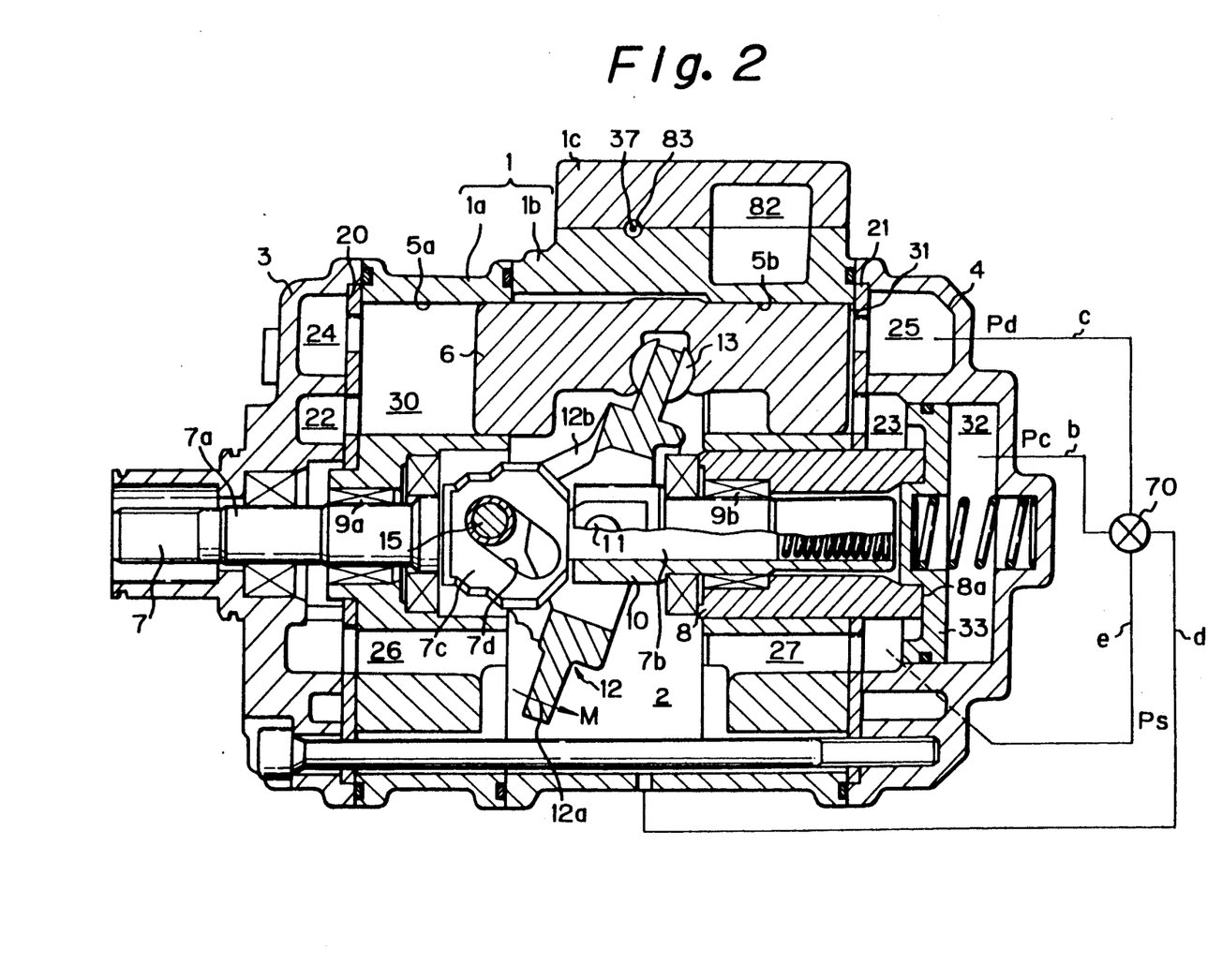
FIG. 2 is a longitudinal cross-sectional view of the compressor of FIG. 1, taken along the line II—II of FIG. 1 and illustrating an internal construction thereof.
Figure 3:
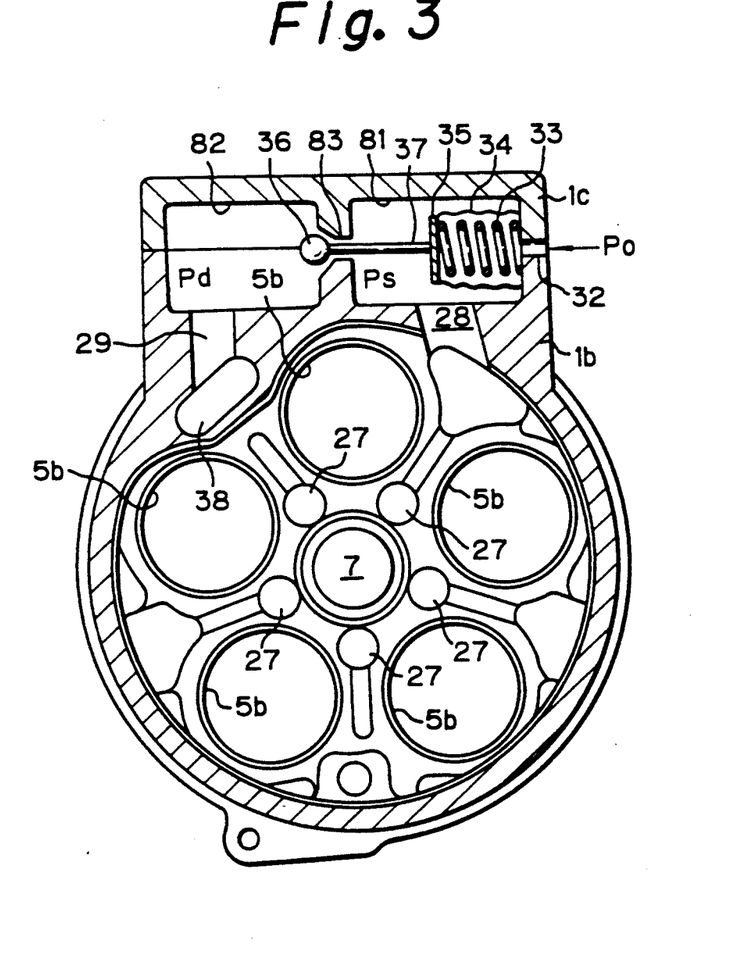
FIG. 3 is a cross-sectional view of the compressor, taken along the line III—III of FIG. 1.

Referring to FIGS. 1 through 3, illustrating a variable capacity refrigerant compressor according to a first embodiment of the present invention, the compressor, as best shown in FIG. 2, has a cylinder block 1 which includes a front cylinder block 1a and a rear cylinder block 1b connected together to form an axially combined assembly. The cylinder block 1 has a swash plate chamber 2 defined therein at a central portion thereof, and tightly closed by a front housing 3 and a rear housing 4, respectively. The cylinder block 1 is provided with a plurality of front cylinder bores 5a on the front side of the swash plate chamber 2 to be circumferentially arranged around an axis of the cylinder block 1, and a plurality of rear cylinder bores 5b on the rear side of the swash plate chamber 2 to be circumferentially arranged around the same axis of the cylinder block 1 in a manner such that the front and rear cylinder bores 5a and 5b are axially aligned with one another to permit a plurality of double-headed pistons 6 to be axially reciprocated therein.

The cylinder block 1 receives therein a drive shaft 7 axially extended along the above-mentioned axis of the cylinder block 1 to be rotatably supported by a front bearing 9a housed in the front cylinder block 1a and a rear bearing 9b housed in a later-described sleeve element 8. The drive shaft 7 includes a front shaft portion 7a, a rear shaft portion 7b, and a flat-shaped connecting shaft portion 7c formed between the front and rear shaft portions 7a and 7b, and having an elongated guide hole 7d formed therein and diagonally extended across the axis of the drive shaft 7.

The cylindrical sleeve element 8 is mounted in the rear cylinder block 1b, and can be slid along the axis of the drive shaft 7. The sleeve element 8 houses therein the rear bearing 9b, which rotatably supports the rear shaft portion 7b via a rotatable cylindrical slide 10. Namely, the slide 10 is slidably fitted on the the rear shaft portion 7b.

The cylindrical slide 10 has an inner end portion positioned in the swash plate chamber 2. This inner end portion of the slide 10 is provided with a pair of coaxial trunnion shafts 11 which are projected from the slide 10 in laterally opposite directions along an axis perpendicular to the axis of the drive shaft 7. The trunnion shafts 11 supports thereon a generally round swash plate 12 in a manner such that the swash plate 12 can turn about the axis of the trunnion shafts 11 to thereby change an angle of inclination thereof with respect to a plane perpendicular to the axis of the drive shaft 7. Also, the swash plate 12 can be rotated together with the drive shaft 7 in a wobbling manner, and the rotating and wobbling motion of the swash plate 12 causes the double-headed pistons 53 to reciprocate in the cylinder bores 5a and 5b via partially spherical shoes 13 arranged between a peripherally extended main portion 12a of the swash plate 12 and recesses in the respective double-headed pistons 53. In addition to the main portion 12a, the swash plate 12 has a front extension 12b extended from the main portion 12a, to transmit the rotation of the drive shaft 7 to the swash plate 12. The front extension 12b is provided with a guide pin 15 movably engaged in the guide hole 7d of the connecting shaft portion 7c of the drive shaft 7. The above-mentioned turning motion of the swash plate 12 about the axis of the trunnion shafts 11 to change the angle of inclination thereof is caused by the sliding motion of the slide 10 cooperating with the sleeve 8. During the changing of the inclination angle of the swash plate 12, the guide pin 15 is moved in and guided by the guide hole 7d, to smooth the turning motion of the swash plate 12. At this stage, the position of the center of the turning motion of the swash plate 12, i.e., the position of the axis of the trunnion shaft 11, is determined so that the reciprocation of each of the double-headed pistons 53 is carried out while always maintaining a top dead center thereof in the rear cylinder bores 5b at a constant position.

Front and rear valve plates 20 and 21 are arranged between the front and rear ends of the cylinder block 1 and the front and rear housings 3 and 4, and suction chambers 22 and 23 and discharge chambers 24 and 25 are formed in the front and rear housings 3 and 4. The front suction chamber 22 communicated with the swash plate chamber 2 via front suction passageways 26 can be communicated with front compression chambers 30 via a suction valve mechanism ( not shown in FIG. 2 ) provided in the front valve plate 20, and the front discharge chamber 24 also can be communicated with the front compression chamber 30 via a discharge valve mechanism ( not shown in FIG. 2 ). The rear suction chamber 23 communicated with the swash plate chamber 2 via rear suction passageways 27 ( see also FIG. 3 ) can be communicated with rear compression chambers 31 via a similar suction valve mechanism ( not shown in FIG. 2 ) provided in the rear valve plate 21, and the rear discharge chamber 25 also can be communicated with the same rear compression chamber 31 via a discharge valve mechanism ( not shown in FIG. 2 ).

A plunger 33 is arranged in the rear housing 4 behind the rear suction chamber 23, and defines a control chamber 32 between a pressure receiving face thereof and the rearmost inner wall of the rear housing 4. The plunger 33 is constantly urged toward the sleeve 8 by a spring element arranged between the plunger 33 and the rear housing 4 to be in contact with an end 8a of the sleeve 8, and can be axially slid toward and away from the control chamber 32 of the rear housing 4.

The control chamber 32 is supplied with a control pressure Pc from a directional control valve 70 via a supply conduit "b". The directional control valve 70 is connected to the rear discharge chamber 25 via a high pressure conduit "c" to introduce a high discharge pressure Pd from the chamber 25, and is connected to the swash plate chamber 2 via a low pressure conduit "d". The control valve 70 is further connected to the rear suction chamber 23 to introduce a suction pressure Ps from the chamber 23 via a pressure detection conduit "e". The control pressure Pc introduced into the control chamber 32 acts on the pressure receiving face of the plunger 33 to axially urge the plunger 33 toward the swash plate chamber 2, and therefore, the plunger 33 exhibits an axial force transmitted to the swash plate 12 via the sleeve 8 and the slide 10. The axial force acting on the swash plate 12 opposes a moment "M" caused by a reacting force due to the compressing action of the double-headed pistons 53, and acts on the swash plate 12 to reduce the inclination angle thereof. When the above-mentioned axial force is balanced with the moment "M", the angle of inclination of the swash plate 12 is established to thereby determine the delivery capacity of the compressor.

As best shown in FIGS. 1 and 3, the rear cylinder block 1b and a flange element 1c define a low pressure chamber 81, a high pressure chamber 82, and a bypass passageway 83 capable of providing a fluid communication between low pressure and high pressure chambers 81 and 82. The low pressure chamber 81 is communicated with the swash plate chamber 2 by way of a low pressure passageway 28 communicated with one of the afore-mentioned rear suction passageways 27, so that the suction pressure is introduced into the chamber 81. The high pressure chamber 82 is communicated with the rear discharge chamber 25 by way of a high pressure passageway 29 communicated with a delivery passageway 38 for delivery of the compressed refrigerant gas, so that the chamber 82 is supplied with the discharge pressure Pd.

A closing valve means "Vc" for openably closing the bypass passageway 83 is arranged between the low and high pressure chambers 81 and 82. The closing valve means includes a bellows element 34 arranged in the low pressure chamber 81 to be fixed, at one end thereof, to a base plate 35 which is, in turn, connected by a valve rod 37 to a ball valve element 36 opening and closing the bypass passageway 83. The other end of the bellows element 34 is fixed to the wall of the low pressure chamber 81, and therefore, the bellows element 34 defines a closed chamber therein which is communicated with the atmosphere via an aperture 32. Namely, the atmospheric pressure $P_0$ is constantly introduced into the chamber of the bellows element 34. In the chamber of the bellows element 34, a spring element 33 is arranged to urge the bellows element 34 toward an extended position thereof. Accordingly, the bellows element 34 is extended to a position where at a pressure, e.g., the suction pressure Ps externally acting on the bellows element 34 and the atmospheric pressure plus the spring force of the spring element 33 internally acting on the bellows element 34, are balanced with one another.

The high pressure chamber 82 is communicated with an external refrigerating circuit of a car air-conditioning system in the same manner as the circuit arrangement of FIG. 8.

In accordance with the above-described construction of the closing valve means "Vc", an equation set forth below is established with regard to the movement of the ball valve 36.

$$(P_0 \times S_1) + F = (P_s \times S_1) + (P_d \times S_2) \qquad (1),$$

wherein $S_1$ indicates the addition of the pressure receiving areas of the bellows element 34 and the base plate 35, F indicates the spring force exerted by the spring 33, and $S_2$ indicates the pressure receiving area of the ball valve 36.

With the compressor, the values of $S_1$, F, and $S_2$ of the equation ( 1 ) are determined so that the bypass passageway 83 of the compressor is closed by the ball valve 36 either when the compressor is usually operated or during a stop of the compressor. Namely, the ball valve 36 is designed and constructed so that when the operation of the compressor is started immediately after a long stoppage of the compressor, to thus cause a state such that the suction pressure Ps becomes lower than the atmospheric pressure $P_0$, the ball valve 36 opens the bypass passageway 83. Practically, the above-mentioned values $S_1$, F, and $S_2$ of the equation (1) is chosen so that, when the suction pressure Ps is approximately $-0.8$ through $-0.5$ kgf/cm$^2$G, the ball valve 36 is moved from a closing to an opening position. As a result, the bypass passageway 83 is opened under a condition such that the suction pressure Ps is less than the atmospheric pressure, i.e., Ps<0.

When the above constructed refrigerant compressor is driven by a car engine via an electromagnetic clutch, the drive shaft 7 is rotated to rotate the swash plate 12, and therefore, the swash plate 12 wobbles to reciprocate the double-headed pistons 53 via the shoes 13 in the cylinder bores 5a and 5b. Accordingly, a refrigerant gas returning from a suction circuit to the compressor enters the swash plate chamber 2 via a compressor inlet port (not shown). The refrigerant gas is subsequently sucked into the front and rear suction chambers 22 and 23 via the front and rear suction passageways 26 and 27, and further introduced into the front and rear compression chambers 30 and 31 to be compressed by the reciprocating double-headed pistons 53.

When compressed, the refrigerant gas is discharged from the front and rear compression chambers 30 and 31 toward the front and rear discharge chambers 24 and 25 via the discharge valve mechanisms, and is further delivered toward the external refrigerating circuit of the car air-conditioning system.

When the car air-conditioning system incorporating therein the above-mentioned compressor is started at a high speed after a long non-operation thereof, a compression of the refrigerant in the liquid phase occurs in the compression chambers 30 and 31 immediately after the start of the operation of the compressor.

At this stage, a further consideration of the operation of the compressor will be made with reference to the graphical illustration of FIG. 4, in addition to FIGS. 1 through 3.

Figure 4:
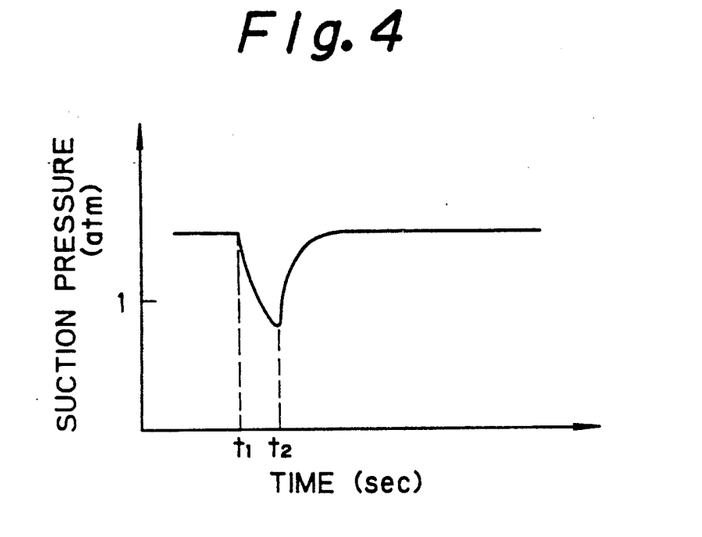
FIG. 4 is a graphical view, illustrating a relationship between the operation time and the suction pressure level of the compressor according to the present invention, when the compressor is used with a car air-conditioning system.

When the operation of the compressor is started at a high speed at a time $t_1$ as shown in the graph of FIG. 4, the suction pressure Ps is lowered to a level less than the addition of the atmospheric pressure $P_0$ and the spring force of the spring 33 immediately after the starting of the operation thereof, and therefore, the bellows element 34 is extended to move the ball valve 36 to the opening position thereof where the bypass passageway 83 is opened. The opening time of the bypass passageway 83 is $t_2$ shown in FIG. 4. Accordingly, the high pressure chamber 82 is short-circuited to the low pressure chamber 81 by the opening of the bypass passageway 83, and therefore, the compressed refrigerant gas is directly routed from the high pressure chamber 82 toward the low pressure chamber 81 via the bypass passageway 83. The routed refrigerant gas is further made to flow from the low pressure chamber 81 into the swash plate chamber 2 via the rear suction passageway 28, and accordingly, the oil mist (the lubricating oil) suspended in the refrigerant gas is supplied to and lubricates the internal mechanical portions and elements of the compressor, such as the contacting surfaces between the double-headed pistons 53 and the cylinder bores 5a and 5b, and between the shoes 13 and pistons 53, and thus a seizure of the compressor immediately after the start of the compressor after a long stoppage thereof (i.e., a long non-operation of the car air-conditioning system) does not occur.

As shown in the graph of FIG. 4, while the operation of the compressor lasts for a several seconds after the time $t_2$, the suction pressure Ps is gradually returned to a level higher than the addition of the atmospheric pressure $P_0$ and the spring force of the spring 33, and therefore, the bellows element 34 is contracted to move the ball valve 36 toward the closing position thereof to close the bypass passageway 83. Namely, the low pressure chamber 81 is completely isolated from the high pressure chamber 82. Accordingly, the suction refrigerant gas entering the swash plate chamber 2 from the external refrigerating circuit is sucked into the compression chambers 30 and 31 via the suction passageways 26 and 27 and the front and rear suction chambers 22 and 23 to be compressed in the chambers 30 and 31 by the double-headed pistons 53. The compressed refrigerant is then discharged to the front and rear discharge chambers 24 and 25 to be delivered to the external refrigerating circuit. Namely, a usual compressing operation by the compressor is carried out.

Figure 5:
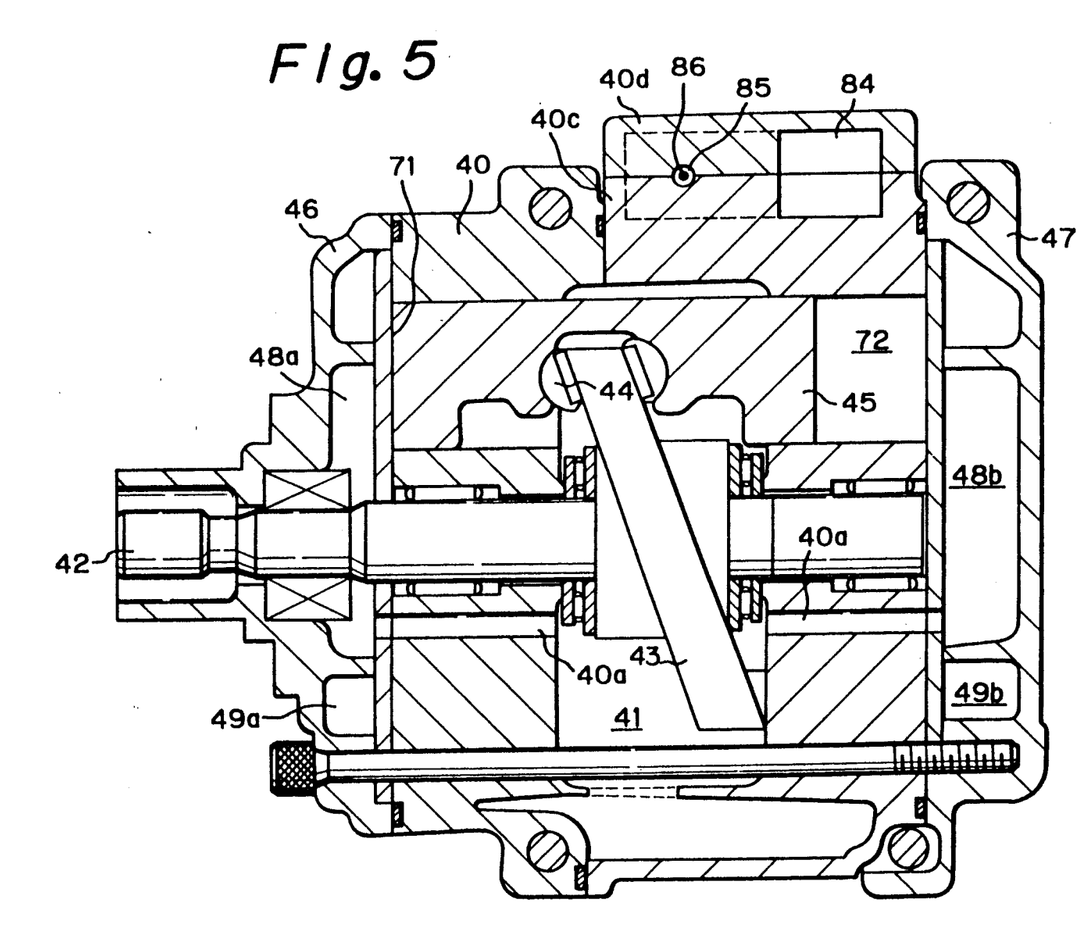
FIG. 5 is a longitudinal cross-sectional view of a refrigerant compressor according to another embodiment of the present invention.

FIG. 5 illustrates another embodiment of the present invention. The refrigerant compressor of FIG. 5 is of the type having a swash plate which cannot be turned to change an angle of inclination thereof. Namely, the compressor of FIG. 5 is a fixed capacity refrigerant compressor having a fixed delivery capacity, and thus the internal mechanical construction of this compressor is simpler than that of the compressor of FIGS. 1 through 4. Nevertheless, the principle of the operation of the fixed capacity swash plate type compressor of FIG. 5, to compress and deliver a refrigerant gas, is substantially similar to that of the variable capacity swash plate type compressor, and therefore, the construction and operation of the compressor according to this embodiment will be hereinafter described with reference to FIG. 5.

The fixed capacity refrigerant compressor of FIG. 5 is provided with low and high pressure chambers (only the high pressure chamber 84 is represented in FIG. 5) similar to those of the compressor of the previous embodiment. The low pressure chamber and the high pressure chamber 84 are provided in a rear cylinder block 40c and a flange element 40d to be communicated by a bypass passageway 85 which is openably closed by a closing valve means described hereinafter. The low pressure chamber is communicated with a swash plate chamber 41 in a manner similar to the low pressure chamber 81 of the previous embodiment, and receives a closing valve means therein, which comprises elements substantially similar to those of the closing valve Vc of the previous embodiment, such as a bellows element for defining an atmospheric pressure chamber, a base plate connected to one end of the bellows element, an aperture for introducing the atmospheric pressure into the atmospheric pressure chamber of the bellows element, a spring arranged in the atmospheric chamber of the bellows element, a ball valve for openably closing the bypass passageway 85, and a rod 86 connecting the ball valve to the base plate.

The compressor of the present embodiment is provided with a cylinder block 40 in which the swash plate chamber 41 is formed to receive a swash plate 43 keyed to a drive shaft 42. The swash plate 41 has a fixed angle of inclination with respect to a plane perpendicular to the axis of the drive shaft 42, and causes a reciprocation of double-headed pistons 45 in the cylinder bores of the cylinder block 40 via shoes 44 upon being rotated with the drive shaft 42. Front and rear housings 46 and 47 are formed with front and rear suction chambers 48a and 48b, and front and rear discharge chambers 49a and 49b.

The front and rear suction chambers 48a and 48b communicated with the swash plate chamber 41 via suction passageways 40a can be communicated with front or rear compression chambers 71 or 72 via suction valve mechanism (not shown). The front discharge chamber 49a can be communicated with the front compression chambers 71 via a front discharge valve mechanism (not shown), and the rear discharge chamber 48b can be communicated with the rear compression chambers 72 via a rear discharge valve mechanism (not shown).

The above-mentioned low pressure chamber formed in the rear cylinder block 40c and the flange element 40d is communicated with the swash plate chamber 41, via a low pressure passageway (not shown) and the suction passageways 40a, to be supplied with a suction pressure Ps. The high pressure chamber 84 is communicated with the discharge chambers 49a and 49b, via a high pressure passageway (not shown) and a discharge passageway (not shown), to be supplied with a discharge pressure Pd. Therefore, the bypass passageway 86 openably closed by the closing valve can operate to prevent a seizure of the internal mechanical portions and elements of the compressor of FIG. 5 immediately after the start of the operation of the compressor after a long non-operation of a car air-conditioning system which incorporates therein the compressor, in a manner similar to the previous embodiment of FIGS. 1 through 4.

In a modification of each of the previous embodiments, a plurality of projections 8 (not shown) may be arranged in the bottom of the high pressure chamber 82 or 84 for effectively separating a lubricating oil suspended in the refrigerant gas from the refrigerant gas. As a result, the lubricating oil can be made to efficiently flow toward the low pressure chamber in response to opening of the bypass passageway 83 or 86 by the closing valve means Vc, and accordingly, the lubrication of the internal mechanical portions and element of the compressor can be performed at a high efficiency.

Figure 6:
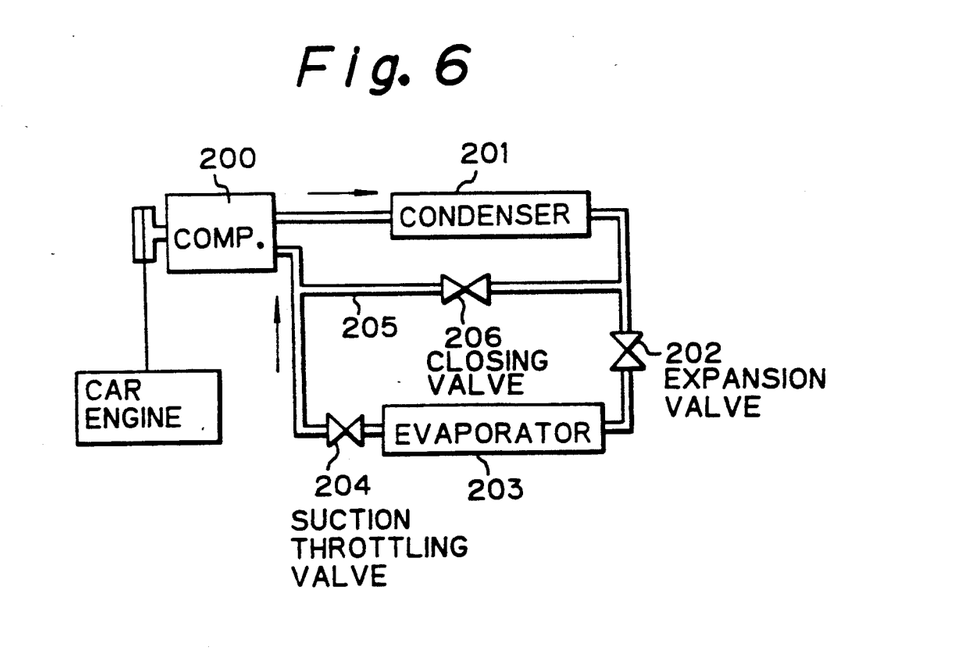
FIG. 6 is a schematic view of a refrigerating circuit arrangement of a car air-conditioning system, illustrating a further embodiment of the present invetion.

FIG. 6 illustrates another embodiment of the present invention. In the embodiment of FIG. 6, an assembly of a bypass passageway and an associated closing valve for preventing a seizure of the internal mechanical portions and elements of a refrigerant compressor for a car air-conditioning system is arranged externally of the compressor.

In FIG. 6, a compressor 200, a condenser 201, an expansion valve 202, an evaporator 203, and a suction throttling valve mechanism 204 are provided for constructing a basic car air-conditioning system. Nevertheless, in the refrigerating circuit of the car air-conditioning system, there is further provided a bypass refrigerant passageway 205, and a closing valve 206 for openably closing the bypass refrigerant passageway 205. Namely, when the closing valve 206 includes a ball valve means capable of opening the bypass passageway 205 in response to a detection of the lowering of the suction pressure Ps to a level lower than the atmospheric pressure at a time immediately after the start of the operation of the compressor 200 after a long non-operation of the system, the compressed refrigerant gas can be directly routed from the outlet side of the compressor 200 toward the inlet side thereof, and therefore, the lubrication of the internal mechanical portions and elements of the compressor 200 can be effectively achieved to thereby prevent a seizure of those portions and elements.

From the foregoing description of the preferred embodiments of the present invention it will be understood that a seizure of the compressor used with a car air-conditioning system can be effectively prevented even if the operation of the compressor is started at a high speed after a long non-operating of the air-conditioning system.

It should be understood that many modifications and variations will occur to a person skilled in the art without departing from the spirit and scope of the present invention claimed in the accompanying claims. For example, although the described embodiments are related to a rotary swash plate type refrigerant compressors, it should be understood that the present invention can be applied to other types of refrigerant compressors such as a variable capacity wobble plate type compressor and a scroll type compressor.

We claim:

1. A rotary swash plate type refrigerant compressor having a suction side from which a refrigerant gas before compression is sucked therein and a discharge side from which a refrigerant gas after compression is delivered, and incorporated in a refrigerating circuit of a car air-conditioning system, comprising:
   a bypass passageway means internally provided in said compressor for interconnecting between said discharge side and said suction side to thereby permit a flow of said refrigerant gas after compression from said discharge side toward said suction side, said refrigerant gas after compression having a lubricant oil suspended therein;
   a pressure sensitive valve closing means disposed in said bypass passageway means for opening said bypass passageway means when a lowering of the suction pressure prevailing in said suction side to a level lower than atmospheric pressure level is sensed at a time immediately after the start of the operation of said compressor after a long non-operation of said air-conditioning system, said opening of said bypass passageway means permitting the lubricant oil together with the refrigerant gas after compression to flow directly from said discharge side toward said suction side;
   an axially extended cylinder block assembly provided with a rotary swash plate rotated with a drive shaft driven by a car engine, and a swash plate operated reciprocatory piston mechanism for compressing said refrigerant gas before compression to thereby produce said refrigerant gas after compression; and
   front and rear housing means tightly attached to front and rear ends of said axially extended cylinder block assembly for defining front and rear suction chambers for said refrigerant gas before compression and front and rear discharge chambers for said refrigerant gas after compression,
   wherein said rotary swash plate type compressor further comprises a flange element fixedly mounted on said cylinder block assembly for defining therebetween a low pressure chamber fluidly communicated with said suction chambers and a high pressure chamber fluidly communicated with said discharge chambers, said bypass passageway means being arranged between said low and high pressure chambers for providing therebetween a fluid connection when said bypass passageway means is opened by said pressure sensitive closing valve means.

2. A refrigerant compressor as claimed in claim 1, wherein said pressure sensitive element comprises a resilient biased bellows element arranged in said low pressure chamber for sensing said lowering of said suction pressure to a level lower than atmospheric pressure, said bellows element having an atmospheric chamber therein constantly supplied with atmospheric pressure opposed to said suction pressure, and wherein said valve element comprises an assembly of a ball valve element and a valve rod element connected to said bellows element, said assembly of a ball valve element and a valve rod element being constantly urged to a position closing said bypass passageway means, and being moved to a position opening said bypass passageway mean sin response to the sensing of said lowering of said suction pressure to a level lower than atmospheric pressure by said bellows element.

* * * * *